United States Patent
Prucka et al.

(10) Patent No.: US 12,460,595 B2
(45) Date of Patent: Nov. 4, 2025

(54) VOLTAGE SUPPLY MODULE CONTROL FOR A FUEL INJECTED ENGINE

(71) Applicant: FCA US LLC, Auburn Hills, MI (US)

(72) Inventors: Michael J Prucka, Ann Arbor, MI (US); Joshua M Burt, South Lyon, MI (US)

(73) Assignee: FCA US LLC, Auburn Hills, MI (US)

( * ) Notice: Subject to any disclaimer, the term of this patent is extended or adjusted under 35 U.S.C. 154(b) by 35 days.

(21) Appl. No.: 18/512,504

(22) Filed: Nov. 17, 2023

(65) Prior Publication Data

US 2025/0163865 A1    May 22, 2025

(51) Int. Cl.
*F02M 51/00* (2006.01)
*F02D 41/06* (2006.01)
*F02D 41/20* (2006.01)

(52) U.S. Cl.
CPC .......... *F02D 41/20* (2013.01); *F02D 41/062* (2013.01); *F02D 2041/2003* (2013.01)

(58) Field of Classification Search
CPC ............ F02D 41/20; F02D 2041/2003; F02D 2041/2006; F02D 2041/201; F02D 2041/2013; F02D 2041/2051; F02N 11/0866; F02P 15/12
USPC ...................................................... 123/478
See application file for complete search history.

(56) References Cited

U.S. PATENT DOCUMENTS

| | | | | |
|---|---|---|---|---|
| 7,878,177 B2* | 2/2011 | Czekala | ................ | F02P 3/0435 |
| | | | | 123/406.47 |
| 2007/0001650 A1* | 1/2007 | Soma | ..................... | B60L 3/0046 |
| | | | | 320/135 |
| 2012/0125296 A1* | 5/2012 | Kitamura | .............. | F02D 41/062 |
| | | | | 123/478 |
| 2013/0104856 A1* | 5/2013 | Fukuda | ................... | F02D 41/20 |
| | | | | 123/490 |
| 2014/0375067 A1* | 12/2014 | Yang | ...................... | B60R 16/03 |
| | | | | 290/38 R |
| 2017/0009689 A1* | 1/2017 | Imai | ...................... | F02M 51/005 |
| 2017/0089292 A1* | 3/2017 | Nishida | ................. | F02D 41/401 |
| 2018/0354368 A1* | 12/2018 | Gotoh | ..................... | B60L 58/12 |
| 2020/0169094 A1* | 5/2020 | Li | ........................... | H02J 7/007 |
| 2021/0180534 A1* | 6/2021 | Itaba | ..................... | F02D 41/402 |

* cited by examiner

*Primary Examiner* — Logan M Kraft
*Assistant Examiner* — James J Kim
(74) *Attorney, Agent, or Firm* — Jeremy J. Klobucar

(57) ABSTRACT

An apparatus for controlling power for a fuel injector includes a fuel injector configured to inject fuel to a cylinder of an engine and a powertrain control module generating a bypass enable signal or a boost enable based on the engine cranking signal. A bypass voltage circuit is electrically coupled to the fuel injector and is configured to provide a system voltage of a vehicle to the fuel injector during a bypass enable signal. A boost voltage circuit is electrically coupled to the fuel injector and configured to increase a system voltage of a vehicle to a boosted voltage during the boost enable signal, wherein the boosted voltage is higher than the system voltage.

20 Claims, 5 Drawing Sheets

000
VOLTAGE SUPPLY MODULE CONTROL FOR A FUEL INJECTED ENGINE

FIELD

The present disclosure relates to starting a vehicle with an internal combustion engine, and, more specifically, to a system and method controlling power to a fuel injector during the starting and operating process.

BACKGROUND

This section provides background information related to the present disclosure which is not necessarily prior art.

Some internal combustion engines are difficult to start when a battery voltage drops to a level that is insufficient to open a fuel injector. For example, some vehicles have large engines that require a large amount of fuel and therefor generally have large fuel injectors. Large fuel injectors have a relatively large spring therein that biases the fuel injector to a closed position.

In general, the larger the spring of the fuel injector, the larger the spring force that has to be overcome. By supplying a sufficiently high voltage to the mechanism or device (e.g., solenoid) that opens the fuel injector, the spring force is overcome. Under some operating conditions (e.g., hot soaked conditions), the "resistance" of the fuel injector to opening can increase. When such a condition occurs, and this condition is coupled with the large spring constant and the normal voltage drop that occurs due to the vehicle battery providing a relative high voltage to the starter of the vehicle, the voltage applied to the mechanism or device (e.g., solenoid) that opens the fuel injector may be insufficient to open the fuel injector.

SUMMARY

This section provides a general summary of the disclosure and is not a comprehensive disclosure of its full scope or all of its features.

In one aspect of the disclosure, an apparatus for controlling power for a fuel injector includes a fuel injector configured to inject fuel to a cylinder of an engine and a powertrain control module generating a bypass enable signal or a boost enable based on the engine cranking signal. A bypass voltage circuit is electrically coupled to the fuel injector and is configured to provide a system voltage of a vehicle to the fuel injector during a bypass enable signal. A boost voltage circuit is electrically coupled to the fuel injector and configured to increase a system voltage of a vehicle to a boosted voltage during the boost enable signal, wherein the boosted voltage is higher than the system voltage.

In another aspect of the disclosure, a method for controlling power to a fuel injector comprises generating a crank signal for starting an engine, generating a boost voltage higher than a system voltage, operating the fuel injectors with the boost voltage during the crank signal, after the crank signal, activating a bypass voltage circuit to couple the system voltage to the fuel injectors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
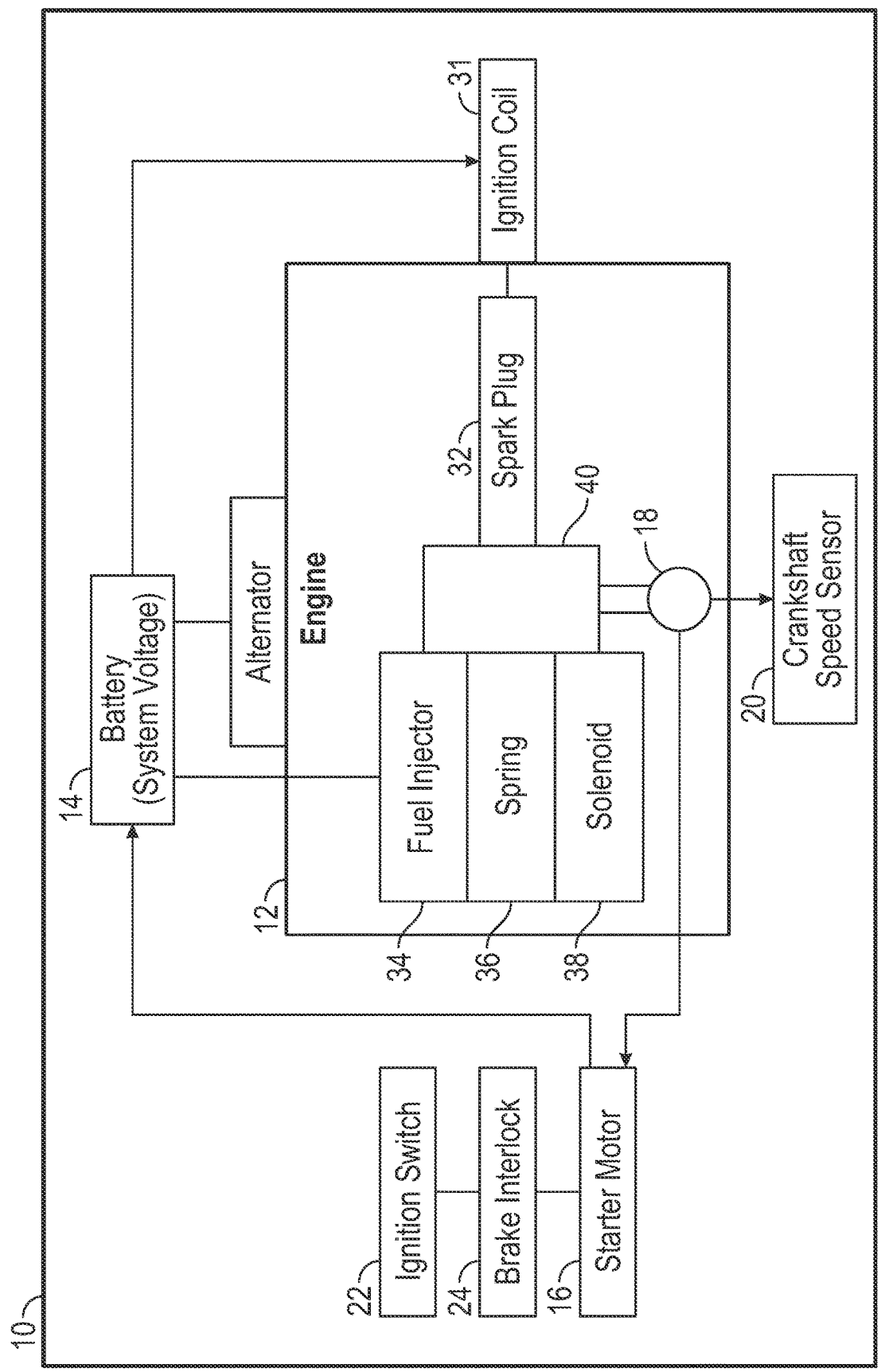
FIG. 1 is a simplified block diagrammatic view of a vehicle having an engine and fuel injectors.

Referring now to FIG. 1, a simplified vehicle 10 is illustrated having an engine 12. The vehicle 10 has a battery 14 that provides system voltage to the electrical components of the vehicle 10. The battery 14 is in communication with a starter motor 16 that is used for engaging and rotating a crankshaft 18 of the engine 12 until the fuel in the cylinder 40 ignites to start the engine 12. The starter motor 16 operates using the system voltage to turn and engage the crankshaft 18. The speed of the crankshaft 18 is generated by a crankshaft speed sensor 20. By knowing the crankshaft speed using the crankshaft speed sensor 20, a determination as to whether the engine has started may be obtained, In order to start the starter motor 16, an ignition switch 22 is activated. Ignition switches 22 are well known in the industry. Ignition switches 22 may be a key activated lock cylinder or code activated system or a combination of both. A brake interlock 24 may also be used to enable the starter motor 16. The brake interlock 24 may not allow the ignition switch 22 to start the engine with the starter motor 16 until the brake pedal is depressed.

The engine 12 may also include an ignition coil 30. In many vehicles, a separate ignition coil 30 is provided for each spark plug 32. A fuel injector 34 is used to provide vaporized fuel into the cylinder 40 of the engine 12. The fuel injector 34 has a spring 36 that is used to close the opening for injecting fuel. A solenoid 38 is used to overcome the force of the spring 36 to form an opening through which fuel is injected into the combustion chamber. As mentioned above, the battery voltage 14 may drop because during the starting process, the starter motor 16, the ignition coil 30, the fuel injectors 34 and other components in the vehicle draw system power at the same time.

Figure 2A:
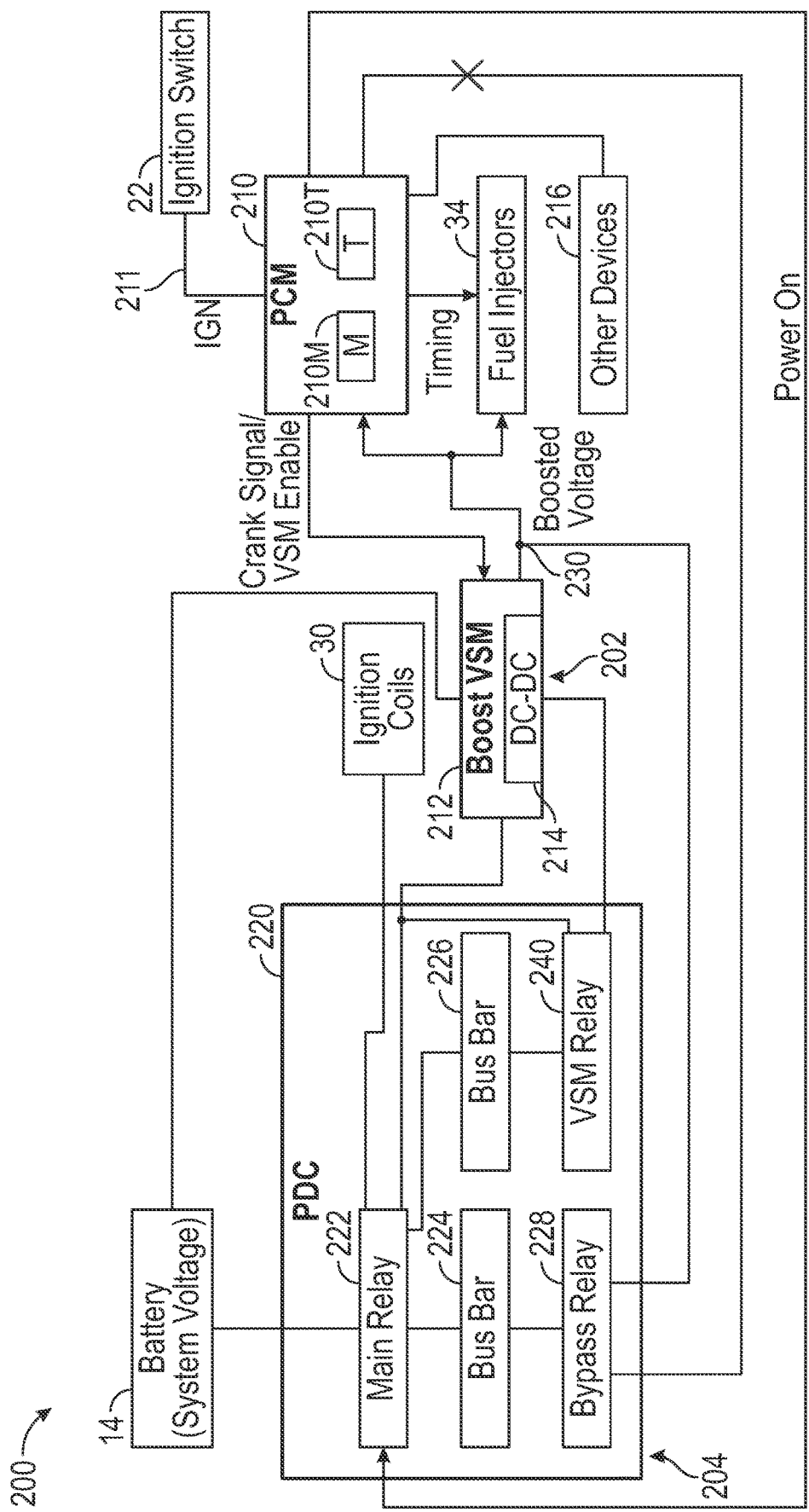
FIG. 2A is a block diagrammatic view of the system for controlling the engine and the fuel injectors during starting of the vehicle.

Referring now to FIG. 2A, a control circuit 200 for controlling the operation of the engine 12 and the fuel injectors 34 is set forth. The control circuit 200 comprises a boost voltage circuit 202 and a bypass voltage circuit 204. The ignition switch 22 provides an ignition signal to a powertrain control module (PCM) 210. The powertrain control module 210 is used to control various aspect of the present disclosure including the starting of the engine and the components illustrated in FIG. 1. The powertrain control module 210 is microprocessor based and has a memory 210M. Likewise, a timer 210T is provided for timing various functions. The PCM 210 is programmed to perform various functions as described below. The powertrain control module 210 may receive an ignition signal over a controller area network 211 that is run throughout the vehicle. Ultimately, a crank signal indicates that the vehicle is cranking or starting up. The crank signal may also be referred to as a voltage supply module enable signal or the VSM enable signal may be generated in response to the crank or ignition signal.

The VSM enable signal is communicated to a voltage supply module 212. The voltage supply module 212 includes a DC-DC converter 214 disposed therein. The voltage supply module 212 generates a voltage that is higher than the system voltage provided by the battery 14. The increased voltage may be referred to as a boosted voltage that is used to power the fuel injectors 34 and other electrical components during the starting process.

The PCM 210 is also used to control other devices 216 within the vehicle 10 by way of example and not limited to a throttle controller and an exhaust gas recirculation valve.

A power distribution controller 220 is also provided within the vehicle 10. The power distribution controller has a main relay 222. The main relay is controlled by a "power on" signal that is communicated from the PCM 210. The main relay 222 is sometimes referred to as an automatic shutdown relay. The main relay 222 provides the system voltage 14 from the battery to various components. One or a number of bus bars 224, 226 may be used depending on the specific power and distribution requirements of the vehicle 10. Likewise, a number of power distribution controllers may also be used depending on the power requirements of the vehicle.

A bypass relay 228 is disposed between the PCM 210 and a common electrical node 230 (common node) between the voltage supply module 212, the PCM 210 and the fuel injectors 34. During the cranking of the engine, the PCM 210 turns off the current flow through the bypass relay 228 (represented as an "X") to shut down the communication of current through the bypass relay 228 to the common node 230.

The main relay 222 is also in communication with the ignition coils 30. During the starting of the engine, the main relay 222 provides power to the ignition coils 30.

The main relay 222 is also in communication with the voltage supply module (VSM) relay 240. The VSM relay 240 is in communication with the main relay 222 through the bus bar 226. The VSM relay 240 is also activated during the starting process of the vehicle. Once the main relay 222 is energized, the system voltage 14 is provided to the bus bar 226 and to the VSM relay 240 which provides system voltage from the battery 14 to the voltage supply module 212. As mentioned above, the system voltage may be reduced from the typical battery voltage due to the many loads being powered at the instant the main relay 222 is activated. The VSM 212 therefore converts a low DC voltage signal of the system voltage to a higher voltage higher than the temporarily reduced system voltage provided by the battery 14.

The DC-DC converter 214 of the VSM 212 may not provide clean power. That is, the operation of the DC-DC converter 214 may cause noise at the common node 230. Therefore, limiting the amount of use of the DC-DC converter 214 is useful.

Figure 2B:
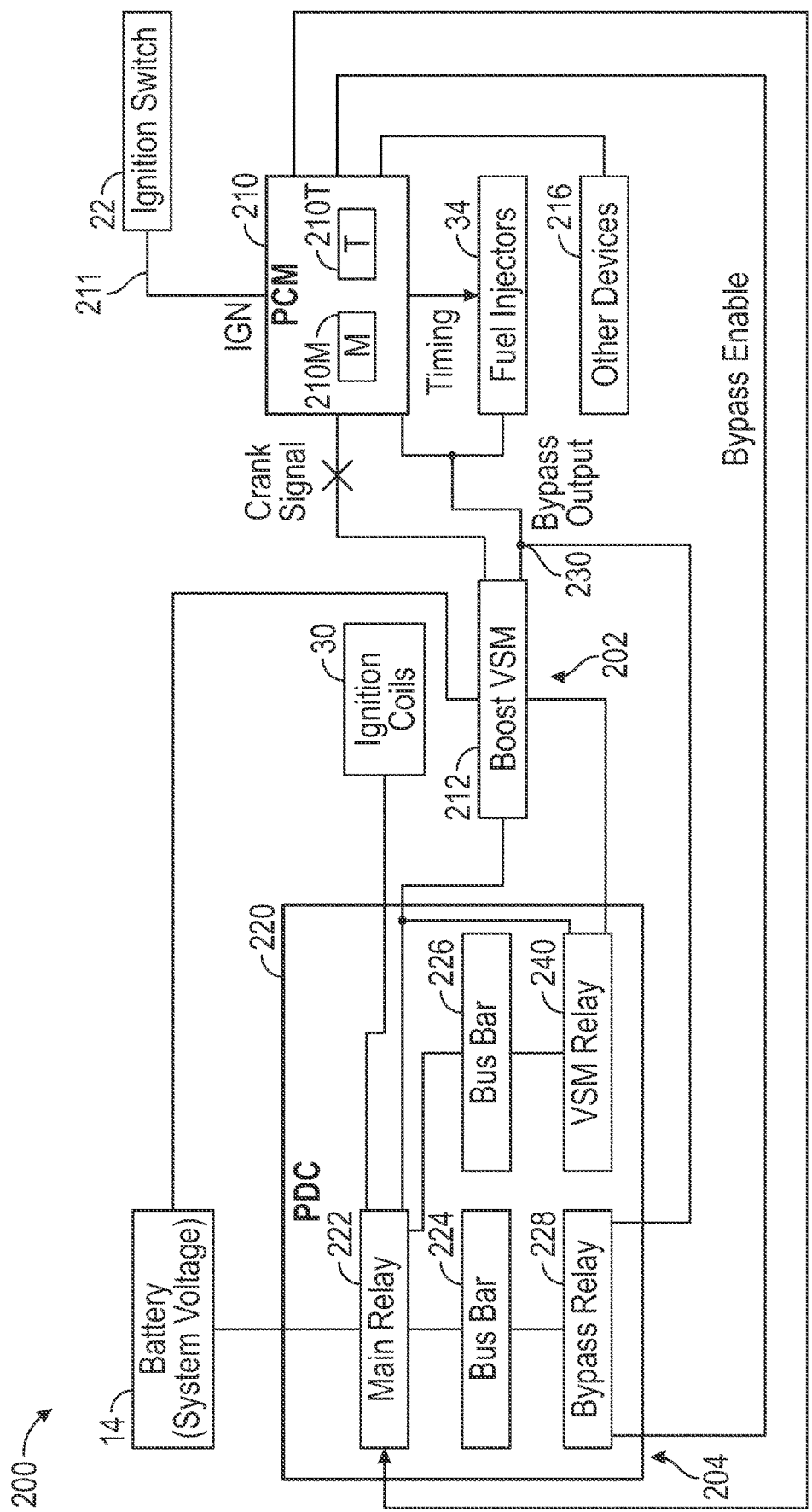
FIG. 2B is a block diagrammatic view of the system for controlling the engine and the fuel injectors during normal operation of the vehicle.

Referring now to FIG. 2B, the circuit of 2A is shown modified so that after the cranking signal has ceased, after the engine has started the VSM 212 no longer powers the electrical components. That is, once the engine has started, a bypass enable signal may be generated by the PCM 210. The determination as to whether the engine has started may be performed in various ways including determining whether the crankshaft speed is above a crankshaft speed threshold. The bypass enable signal is communicated to the bypass relay 228 which acts as part of a bypass voltage circuit 204. The VSM enablement signal is no longer communicated to the VSM 212. The voltage at the node 230 is therefore the system voltage 14 that is communicated through the bypass relay 228 in response to the bypass enable signal. The boost voltage supply module 212 is part of the boost voltage circuit 202 and is deactivated when no crank signal or VSM enable signal is provided thereto. The node 230 therefore is provided with an electrically cleaner more stable source of voltage during the normal operation of the vehicle as compared to the starting process.

Figure 3:
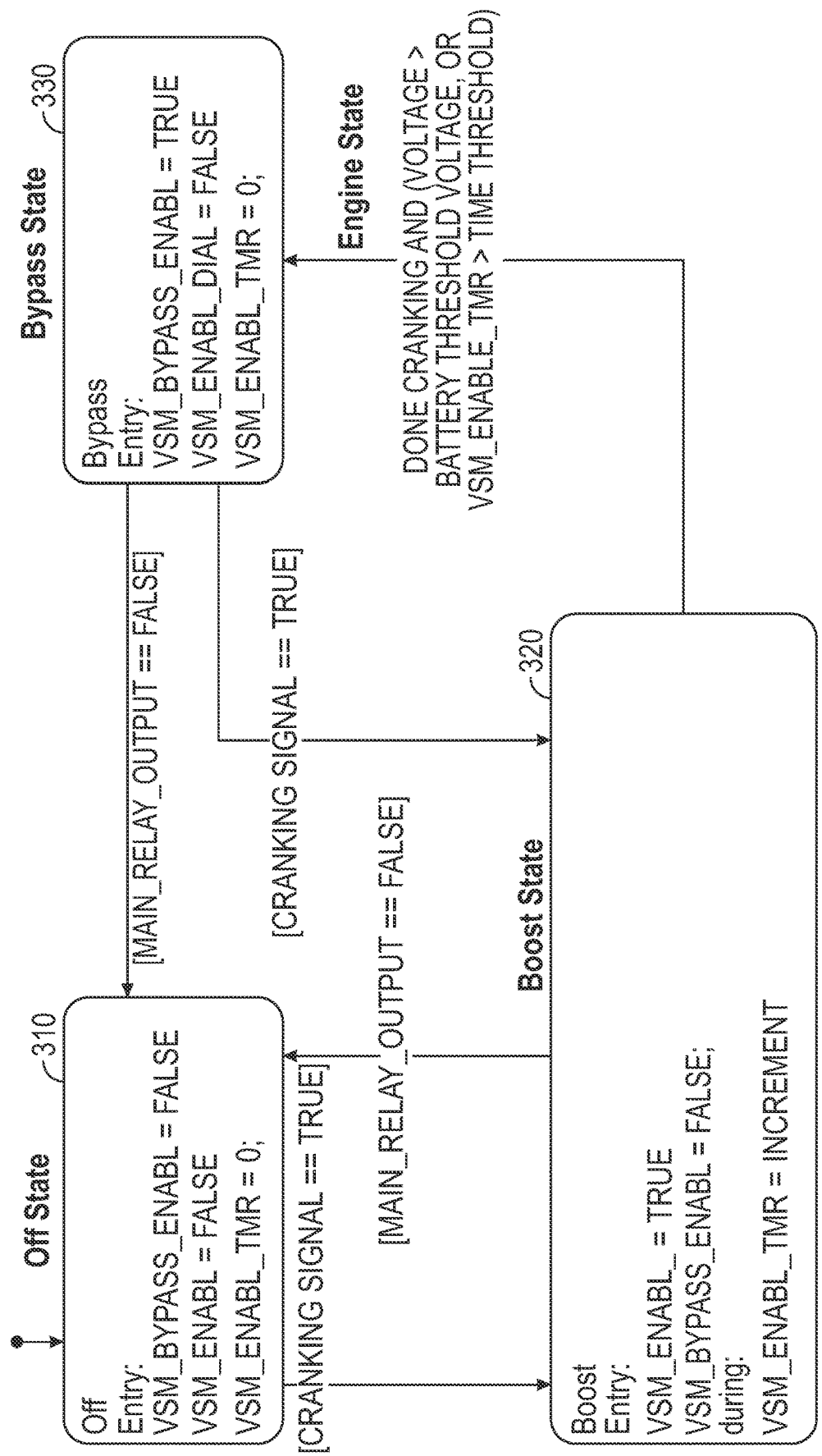
FIG. 3 is a state diagram for operating the engine and fuel injection system.

Referring now to FIG. 3, a state diagram for the control circuit 200 is illustrated. The circuit 200 starts in an off state 310. In the off state 310, the boost voltage supply bypass enable signal is false, meaning it is disabled or not active. Likewise, the VSM enable signal is also false or not active. A VSM timer enable signal is also set to zero.

To move from the off state 310 to the boost state 320, a crank signal is determined that corresponds to the vehicle starting. As mentioned above, the PCM 210 may generate the crank signal which, in turn, generates a VSM enable signal which is set to true in the state 320. The VSM enable timer (VSM_ENABLE_TMR) is started in the boost state. In this state, a bypass enable signal is set to false indicating off or not active, so that the bypass relay 228 is ensured to be in the off state. During the boost state 320, the timer continuously operates to determine whether to leave the boost state and enter the bypass state when the time period counted by the timer is greater than a time period as described below. If the main relay output is turned off then the off state 310 is entered.

To move from the boost state to the bypass state 330, various conditions may be checked. In this example when the engine is done cranking and either the system voltage is greater than a voltage threshold or the VSM enable timer is greater than a time threshold then the bypass state is entered. In this manner, the timer prevents the boost state 320 from being activated for too long of a time period. Likewise, the boost state 320 is also entered when the system voltage is greater than a predetermined voltage strong enough to enable the fuel injectors to operate properly.

Bypass state 330 may be returned to the boost state 320 when the vehicle is cranking. That is, when a crank signal is generated, the bypass state 330 is returned to the boost state 320.

In the bypass state, the boost VSM 212 is in the off state and the bypass relay 228 is activated by the PCM. As mentioned above, this allows the voltage from the battery 14 to be provided to the node 230. In this example, the bypass enable signal is activated, the VSM enable signal is deactivated and the enable timer is set to 0. To move from the bypass state 330 to the off state 310, the main relay output must be deactivated. That is, the key or off switch for the engine may be activated to return from the bypass state 330 to the off state 310.

Figure 4:
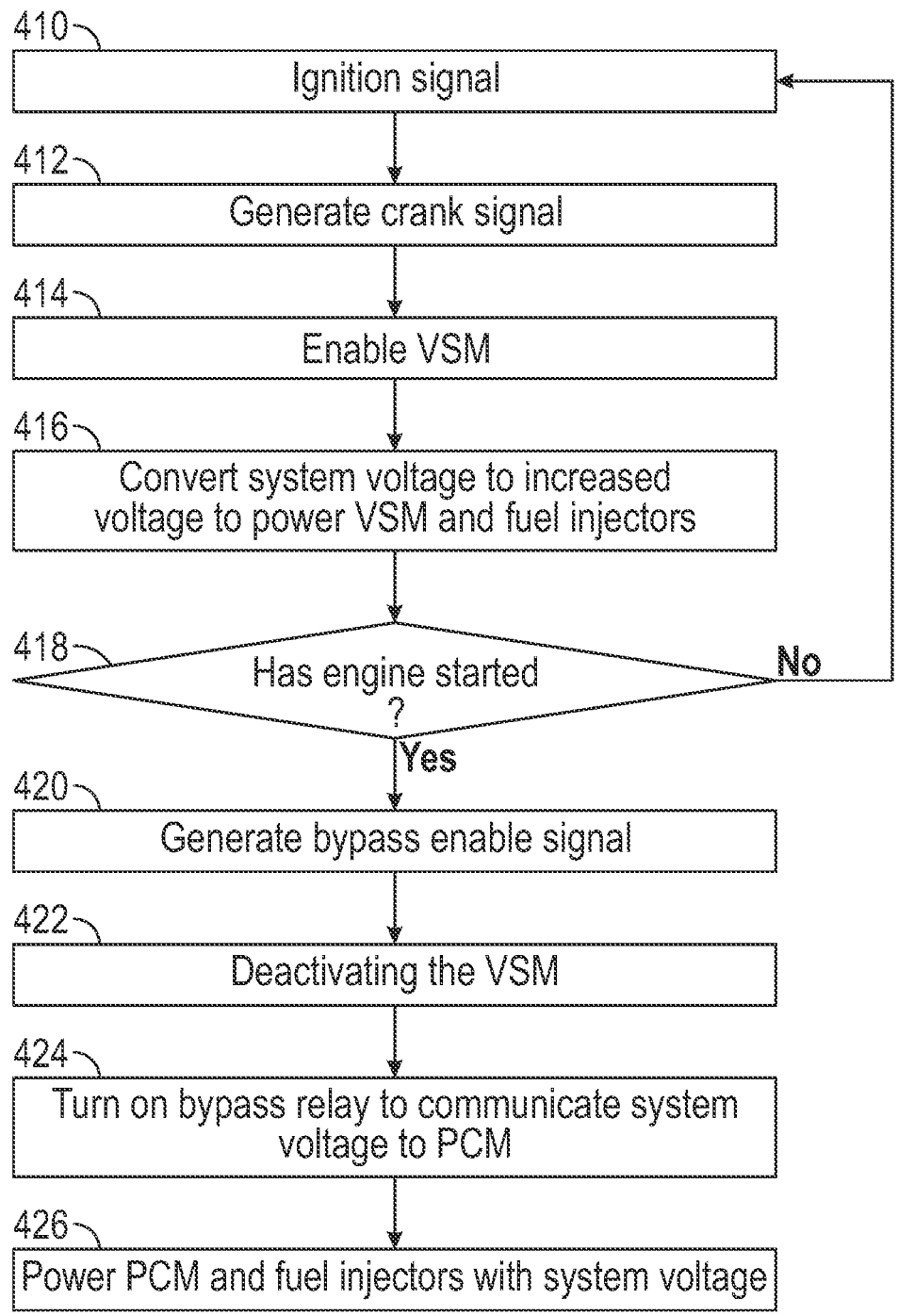
FIG. 4 is a simplified flowchart of a method of operating the control system for the powertrain control module and fuel injectors.

Referring now to FIG. 4, a simplified method for operating the system is set forth. In step 410, an ignition signal is generated. The ignition signal corresponds to the operation of the ignition switch for starting the vehicle. An engine cranking signal or simply crank signal is generated after the ignition signal. Based on the crank signal generated in step 412, the boost voltage supply module is enabled in step 414. As mentioned above, the voltage supply module receives the system voltage 14 that may be comprised to a lower than usual value. The DC-DC converter 214 illustrated above converts the low system voltage to a voltage suitable for activating the fuel injector 34. That is, the voltage provided by the DC-DC converter of the boost VSM 212 is great enough to allow the solenoid in the fuel injectors to overcome the spring force. The conversion of the system voltage to an increase voltage is performed in step 416. In step 418, it is determined whether the engine has started. The engine has started when, for example, the crankshaft speed has increased above a predetermined crankshaft speed. The predetermined crankshaft speed is determined during the development of the particular engine.

When step 418 indicates the engine has started, step 420 generates a bypass enable signal. The bypass enable signal may be generated at the powertrain control module 210. In step 422, the voltage supply module 212 is deactivated. That is, the crank signal or the VSM enable signal is no longer enabling the boost VSM to provide voltage to the common node 230.

In step 424, the bypass enable signal activates the bypass relay 228 to communicate and selectively couple the system voltage to the node 230. That is, in step 426, the powertrain control module 210 is provided with the system voltage from the battery 14. This allows clean power to be provided to the PCM not through the DC-DC converter 214.

As mentioned above, FIG. 4 is a simplified version of the system and the states illustrated at the states 310-320.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms including "connected," "engaged," "coupled," "adjacent," "next to," "on top of," "above," "below," and "disposed," Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A CR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit: other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term "code" or "instructions," as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term "storage medium" or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R. Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python-.

What is claimed is:

1. An apparatus for controlling power for a fuel injector, the apparatus comprising:
   a fuel injector configured to inject fuel to a cylinder of an engine;
   a powertrain control module generating a bypass enable signal or a boost enable based on an engine cranking signal corresponding to starting of the engine;
   a bypass voltage circuit is electrically coupled to the fuel injector and configured to provide a system voltage of a vehicle to the fuel injector during a bypass enable signal; and
   a boost voltage circuit is electrically coupled to the fuel injector and configured to increase a system voltage of a vehicle to a boosted voltage during the boost enable signal when the engine cranking signal corresponds to the engine starting and, when the engine has started and the engine cranking signal has ceased, discontinuing the boost enable signal so the fuel injector is powered using the system voltage, wherein the boosted voltage is higher than the system voltage.

2. The apparatus of claim 1 wherein the bypass voltage circuit and the boost voltage circuit are coupled to a common node.

3. The apparatus of claim 2 wherein the powertrain control module and the fuel injector are coupled to the common node.

4. The apparatus of claim 3 wherein the bypass voltage circuit comprises a bypass relay electrically coupled to the system voltage, said bypass relay selectively couples the system voltage to the common node.

5. The apparatus of claim 3 wherein the bypass voltage circuit comprises a bypass relay electrically coupled to the system voltage, said bypass relay selectively couples the system voltage to the common node during a bypass state.

6. The apparatus of claim 5 wherein powertrain control module generates the bypass enable signal and communicates the bypass enable signal to the bypass relay.

7. The apparatus of claim 3 wherein the boost voltage circuit comprises a boost voltage supply module coupled to the common node.

8. The apparatus of claim 7 wherein the boost voltage supply module comprises a DC-DC converter.

9. The apparatus of claim 7 wherein the powertrain control module is coupled to a main relay to activate the main relay in response to an ignition signal.

10. The apparatus of claim 7 wherein the boost voltage circuit and the bypass voltage circuit are part of a control circuit, said control circuit comprising a boost state and a bypass state, said boost state is active during starting of a vehicle and the bypass state is active when the vehicle has started.

11. The apparatus of claim 1 wherein the boost voltage circuit and the bypass voltage circuit are part of a control circuit, wherein the control circuit switches from a boost state to a bypass state after a predetermined time period.

12. The apparatus of claim 1 wherein the boost voltage circuit and the bypass voltage circuit are part of a control circuit, wherein the control circuit switches from a boost state to a bypass state when a system voltage is above a predetermined battery voltage.

13. A method for controlling power to a fuel injector, the method comprising:
   generating a crank signal for starting an engine while the engine is starting;
   generating a boost voltage higher than a system voltage;
   operating the fuel injectors with the boost voltage during the crank signal;
   after the engine is started and the crank signal has ceased, activating a bypass voltage circuit to couple the system voltage to the fuel injectors and disable operating the fuel injectors from using the boost voltage.

14. The method of claim 13 wherein generating the crank signal comprises starting the engine.

15. The method of claim 13 wherein generating the boost voltage comprises generating the boost voltage at a boost voltage supply module.

16. The method of claim 13 wherein generating the boost voltage comprises generating the boost voltage from a DC-DC converter.

17. The method of claim 13 wherein generating the boost voltage comprises generating the boost voltage during a boost state.

18. The method of claim 17 further comprising moving from the boost state to a bypass state in response to being in the boost state greater than a predetermined time.

19. The method of claim 17 further comprising moving from the boost state to a bypass state in response to a battery voltage higher than a battery voltage threshold.

20. The method of claim 13 wherein activating the bypass circuit comprises activating a bypass relay from a powertrain controller.

* * * * *